Nov. 8, 1955            G. GARNIER            2,723,002
GEAR BOX LUBRICATING MEANS
Filed April 5, 1952
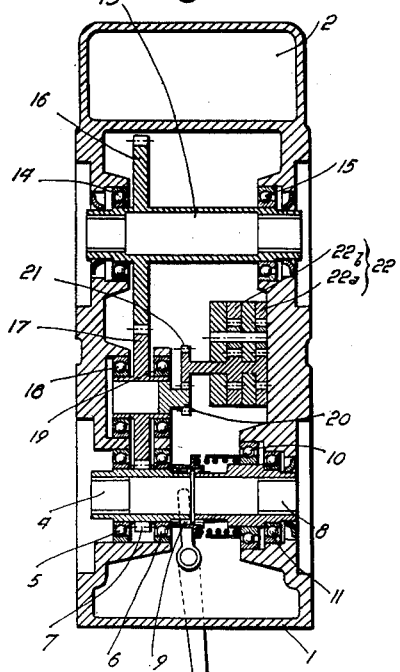
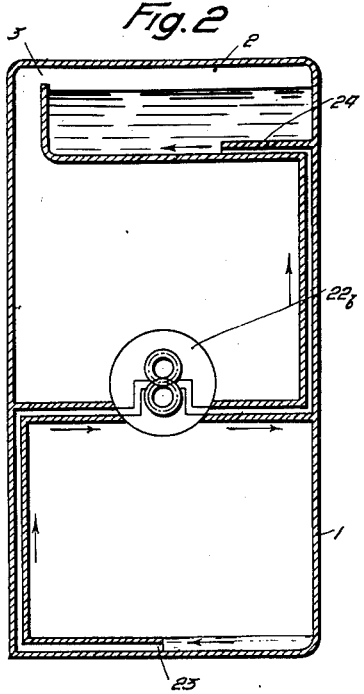
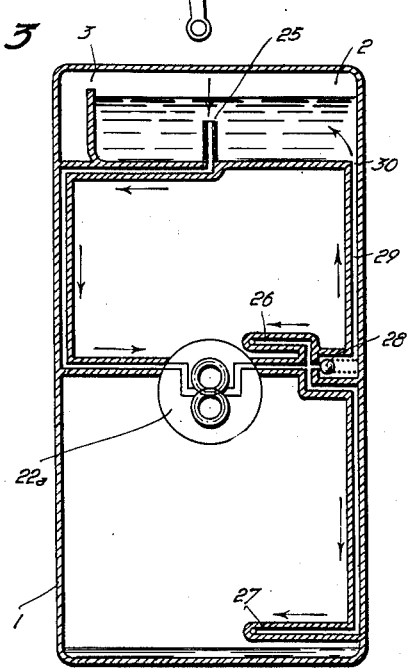
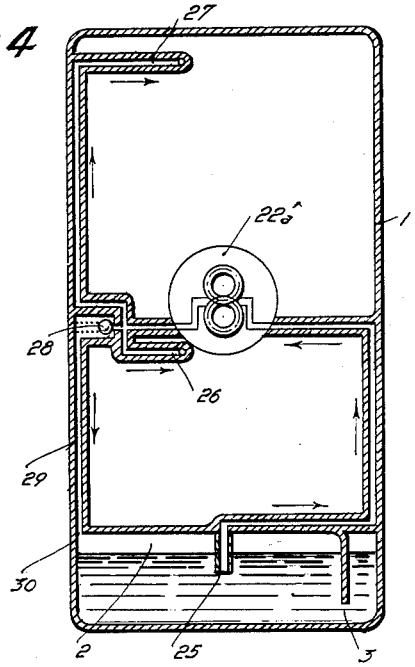
INVENTOR
GEORGES GARNIER
By *Maxwell E. Sparrow*
ATTORNEY United States Patent Office 2,723,002
Patented Nov. 8, 1955

2,723,002
GEAR BOX LUBRICATING MEANS

Georges Garnier, Asnieres, France, assignor to Air-Equipement, Asnieres, France, a French company Application April 5, 1952, Serial No. 280,834

Claims priority, application France April 6, 1951

8 Claims. (Cl. 184—6)

This invention relates to gear-boxes for accessories which are fitted on board aircraft and are intended to drive apparatus such as generator, compressor, hydraulic pump, etc., and it has for its subject-matter improvements in the said gear-boxes particularly in their lubricating system, so as to ensure this lubrication both when the aircraft is in normal flight and when it is in inverted flight.

The gear-box improved according to the invention is characterized more particularly by the fact that the lubricating pump is fed from an oil tank, which is placed in the upper part of the gear-box casing and normally supplied with oil by drainage pump which sucks in the oil from the bottom of the casing, the arrangement being such that when the aircraft is flying upside down the said tank is filled by gravity, the drainage pump then running idle, the intake of the lubricating pump nevertheless always remaining submerged in the said tank, the gear-box standing upright or being upside down.

In a preferred embodiment, the improved gear-box covered by the invention is further particularly characterized by the following features, taken either separately or combined with each other.

The oil tank communicates with the inside of the gear-box casing through an opening placed substantially flush with the upper wall of the casing. The oil intake of the lubricating pump opens substantially into the centre of the oil tank. The drainage pump is designed to have an output exceeding that of the lubricating pump. The drainage pump and the lubricating pump have a single driving shaft, common to both pumps. Both pumps are constructed in the form of a double pump unit. A discharge regulating valve of the lubricating pump opens out into the oil tank.

Other special features and characteristics of the invention are brought out in the following description, which relates to a specimen embodiment of a gear-box, this specimen embodiment being given purely as an illustration and being shown diagrammatically in the accompanying drawing, in which:

Fig. 1 is a vertical cross-section of the gear-box when the aircraft is flying normally, substantially through the axis of the pumps;

Fig. 2 is a vertical cross-section, at 90° as compared with the preceding one, through the drainage pump and its circuits;

Fig. 3 is a similar cross-section to the preceding one, through the lubricating pump and its circuits;

Fig. 4 is a similar view to that shown in Fig. 3, but when the aircraft is in inverted flight.

The gear-box shown in the drawing comprises a casing 1 in the upper part of which is an oil tank 2, communicating through an opening 3 with the inside of the casing.

In the casing 1 are located: a driving shaft 4, which is carried on two bearings 5 and 6 and which is integral with a driving pinion 7; a driven shaft 8 which is located in the extension of the shaft 4, to which it can be coupled by a dog clutch 9, which is carried on bearings 10 and 11 and which forms a power take off (for a generator, for instance); a driven shaft 13, carried on two bearings 14 and 15, integral with a toothed wheel 16 and forming two other power take off points.

The pinion 7 actuates the wheel 16 through a transmission wheel 17 the shaft of which is carried on two bearings 18 and 19 and which carries a driving pinion 20 engaged with the driving pinion 21 of the group of gear pumps 22 consisting of a lubricating pump 22a and a drainage pump 22b, the output of the latter being greater than that of the former.

The oil intake 23 of the drainage pump 22b is in the bottom of the casing 1 (Fig. 2), while the discharge 24 of the same pump opens into the bottom of the tank 2.

The oil intake 25 of the lubricating pump 22a is substantially in the centre of the tank 2. The output of this pump, passing through the pipings 26 and 27 to the points to be lubricated, is regulated by a discharge valve 28 opening into a piping 29 which, at 30, opens into the bottom of the tank 2.

When the aircraft is in normal flight (Figs. 1, 2 and 3) the drainage pump 22b sucks in from the bottom of the casing 1 the oil which accumulates there naturally under the influence of gravity, and discharges it into the tank 2 in which the oil level is definitely more than half-way up the tank. The oil intake 25 of the lubricating pump 22a is thus constantly immersed and this pump can operate normally.

When the aircraft is in inverted flight (Fig. 4), the tank 2 is at the bottom. The drainage pump will idle, but the oil then accumulates by gravity in the said tank. Thanks to the special position of the oil intake 25, it is also submerged when the gear-box is in this position, and the lubricating pump can still operate normally.

It is obvious that the specimen embodiment of the improved gear-box described above and shown in the accompanying drawing has been given solely by way of illustration and is in no way restrictive, and that any detail changes can be made therein without this entailing any deviation from the spirit of the invention.

What I claim is:

1. A gear-box for driving accessories on board aircraft, comprising a casing with gearing arranged therein and means for operatively connecting the said gearing respectively with power means and accessories to be driven, an oil tank provided in the upper part of the casing for containing oil, a lubricating pump of which the intake is substantially in the center of said tank and the discharge is in communication with the points of the gear-box to be lubricated, a drainage pump of which the suction opens into the bottom of the casing and of which the discharge opens into the said oil tank and a passageway arranged to afford communication between said casing and oil tank whereby oil in the casing is allowed to flow into said tank when the casing is set upside down, so that the lubricating pump may be fed, the gear-box standing upright or being upside down.

2. A gear-box according to claim 1, in which said passageway is substantially flush with the upper wall of the said casing.

3. A gear-box according to claim 1, in which the drainage pump is adapted to have a higher output than the lubricating pump.

4. A gear-box according to claim 1, in which the lubricating pump and the drainage pump comprise a common driving shaft.

5. A gear-box according to claim 1, in which the pumps are operatively coupled to the gearing of the gear-box so as to be driven by the said gearing.

6. A gear-box according to claim 1, in which the two pumps are grouped in the form of a double pump unit.

7. A gear-box according to claim 1, comprising further a discharge regulating valve fitted in the discharge of the lubricating pump and in communication with the oil tank.

8. A gear-box for driving accessories on board aircraft, comprising a casing with gearing mounted therein and means for operatively coupling the said gearing to organs outside the casing, an oil tank placed in the upper part of the casing for containing oil, a double oil pump located in said casing and comprising a lubricating gear pump component and a drainage gear pump component, power transmission means for operatively connecting the oil pump to the gearing of the gear-box, a piping connected to the intake of the lubricating pump component and ending at the center of the said oil tank; a piping connected to the discharge of the lubricating pump component and ending at the points of the gear-box to be lubricated, a piping connected to the intake of the drainage pump component and opening at the bottom of the casing, a piping connected to the discharge of the drainage pump component and to the said oil tank and a passageway arranged to afford communication between said casing and oil tank whereby oil in the casing is allowed to flow into said tank when the casing is set upside down.

References Cited in the file of this patent
UNITED STATES PATENTS

| | | |
|---|---|---|
| 1,945,056 | Marden | Jan. 30, 1934 |
| 2,235,793 | Berger | Mar. 18, 1941 |
| 2,541,850 | Wade | Feb. 13, 1951 |